(12) United States Patent
Zekiros et al.

(10) Patent No.: US 11,650,067 B2
(45) Date of Patent: May 16, 2023

(54) SYSTEM AND METHOD FOR REDUCING ROUTE TIME USING BIG DATA

(71) Applicant: Toyota Motor North America, Inc., Plano, TX (US)

(72) Inventors: Fanuel Zekiros, Addison, TX (US); Gagandeep Singh Saini, Plano, TX (US); Katherine L. Naiser, Plano, TX (US); Mathew D. Gardner, Lewisville, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 344 days.

(21) Appl. No.: 16/505,508

(22) Filed: Jul. 8, 2019

(65) Prior Publication Data
US 2021/0010820 A1  Jan. 14, 2021

(51) Int. Cl.
*G01C 21/34* (2006.01)
*G08G 1/0967* (2006.01)
*G01C 21/36* (2006.01)

(52) U.S. Cl.
CPC ..... *G01C 21/3492* (2013.01); *G01C 21/3484* (2013.01); *G01C 21/3694* (2013.01); *G08G 1/096775* (2013.01)

(58) Field of Classification Search
CPC ............ G01C 21/3492; G01C 21/3484; G01C 21/3694; G01C 21/3415; G08G 1/096775; G08G 1/096805; G08G 1/095; G08G 1/096844; G08G 1/096811
See application file for complete search history.

(56) References Cited

U.S. PATENT DOCUMENTS

| | | | |
|---|---|---|---|
| 9,074,905 B2 | 7/2015 | Nishiuma et al. |
| 9,437,110 B2 | 9/2016 | Otake |
| 9,697,729 B2 | 7/2017 | Vahidi et al. |
| 9,977,430 B2 | 5/2018 | Shalev-Shwartz et al. |
| 10,108,868 B1 | 10/2018 | Wendel et al. |
| 10,140,859 B1 | 11/2018 | Greenberger et al. |
| 10,150,410 B2 | 12/2018 | Medenica et al. |
| 10,234,302 B2 | 3/2019 | Singhal et al. |

(Continued)

FOREIGN PATENT DOCUMENTS

| FR | 3045545 A1 * | 6/2017 |
| WO | WO 2017/140104 | 8/2017 |

(Continued)

OTHER PUBLICATIONS

Machine Translation of FR3045545A1 (Year: 2015).*

*Primary Examiner* — Kenneth J Malkowski
*Assistant Examiner* — Andrew J Cromer
(74) *Attorney, Agent, or Firm* — Snell & Wilmer LLP (57) ABSTRACT

Methods and systems for navigating a vehicle. The system includes an input/output device of the vehicle configured to receive a destination from a user of the vehicle. The system also includes a transceiver of the vehicle configured to receive traffic data and traffic light timing data of traffic lights between a current location of the vehicle and the destination. The system also includes an electronic control unit (ECU) of the vehicle configured to determine one or more routes from the current location to the destination based on the traffic data and the traffic light timing data.

16 Claims, 8 Drawing Sheets

(56) References Cited

U.S. PATENT DOCUMENTS

| | | | |
|---|---|---|---|
| 2005/0021225 A1* | 1/2005 | Kantarjiev | G01C 21/3691 |
| | | | 701/527 |
| 2005/0134478 A1* | 6/2005 | Mese | G08G 1/096716 |
| | | | 340/901 |
| 2008/0012726 A1* | 1/2008 | Publicover | G08G 1/096791 |
| | | | 340/932 |
| 2013/0162449 A1* | 6/2013 | Ginsberg | G08G 1/081 |
| | | | 340/910 |
| 2017/0069208 A1* | 3/2017 | Nair | G01C 21/3492 |
| 2018/0211120 A1 | 7/2018 | Smith et al. | |
| 2018/0252178 A1 | 9/2018 | Payne et al. | |
| 2018/0265070 A1 | 9/2018 | Wiesbeck et al. | |

FOREIGN PATENT DOCUMENTS

| | | |
|---|---|---|
| WO | WO 2018/138767 | 8/2018 |
| WO | WO 2018/147874 | 8/2018 |

\* cited by examiner

SYSTEM AND METHOD FOR REDUCING ROUTE TIME USING BIG DATA

BACKGROUND

1. Field

This specification relates to a system and a method for reducing route time by using big data to learn traffic lights and traffic patterns.

2. Description of the Related Art

Drivers may use navigation systems to navigate from a current location to a destination. The navigation systems may provide a set of turn-by-turn directions for the driver to follow to get from the current location to the destination. Some navigation systems include an estimated time to take from the current location to the destination based on traffic. However, in many situations, the estimated time is inaccurate by a significant amount of time. Having more accurate estimates of time to take from the current location to the destination would increase user satisfaction with the navigation system, as the user is better able to plan their time. In addition, having more accurate estimates of time to take from the current location to the destination may also increase accuracy of identifying the fastest route. Thus, there is a need for improved navigation systems.

SUMMARY

What is described is a system for navigating a vehicle. The system includes an input/output device of the vehicle configured to receive a destination from a user of the vehicle. The system also includes a transceiver of the vehicle configured to receive traffic data and traffic light timing data of traffic lights between a current location of the vehicle and the destination. The system also includes an electronic control unit (ECU) of the vehicle configured to determine one or more routes from the current location to the destination based on the traffic data and the traffic light timing data.

Also described is a system for navigating a vehicle. The system includes an input/output device of the vehicle configured to receive a destination from a user of the vehicle. The system also includes a location sensor configured to detect a current location of the vehicle. The system also includes a transceiver of the vehicle configured to communicate the current location and the destination to a remote data server. The system also includes a memory of the remote data server configured to store traffic data and traffic light timing data of traffic lights between the current location and the destination. The system also includes a processor of the remote data server configured to determine one or more routes from the current location to the destination based on the traffic data and the traffic light timing data. The system also includes a transceiver of the remote data server configured to receive the current location and the destination and communicate the determined one or more routes from the current location to the destination to the transceiver of the vehicle for display by the input/output device of the vehicle.

Also described is a method for navigating a vehicle. The method includes receiving, by an input/output device of the vehicle, a destination from a user of the vehicle. The method also includes detecting, by a location sensor of the vehicle, a current location. The method also includes storing traffic data and traffic light timing data of traffic lights between the current location of the vehicle and the destination. The method also includes determining one or more routes from the current location to the destination based on the traffic data and the traffic light timing data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for using traffic light data to improve driving of a vehicle. Conventional navigation systems use traffic data to generate estimates of time taken to travel to a destination. However, traffic data alone may not account for the possible delays that a vehicle may encounter between the current location of the vehicle to the destination. For example, the vehicle may be stuck at a traffic light that has a light pattern that results in the vehicle waiting at the traffic light for a significant period of time. When there are two possible routes that have similar associated travel times, delays encountered by traffic lights may render one route superior to the other in terms of travel time.

The systems, vehicles, and methods described herein use traffic light timing data associated with traffic lights between the current location and the destination to provide more accurate travel times associated with the proposed routes between the current location and the destination. When more accurate travel times are available, the fastest route may be chosen and the user of the navigation system may be better able to plan their day.

In addition, when a vehicle is aware of traffic light timing data, the vehicle may be able to provide an indication to the driver of the vehicle when the upcoming light will turn green, yellow, or red. The driver may be able to use this information to drive in safer ways and more energy efficient ways.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1:
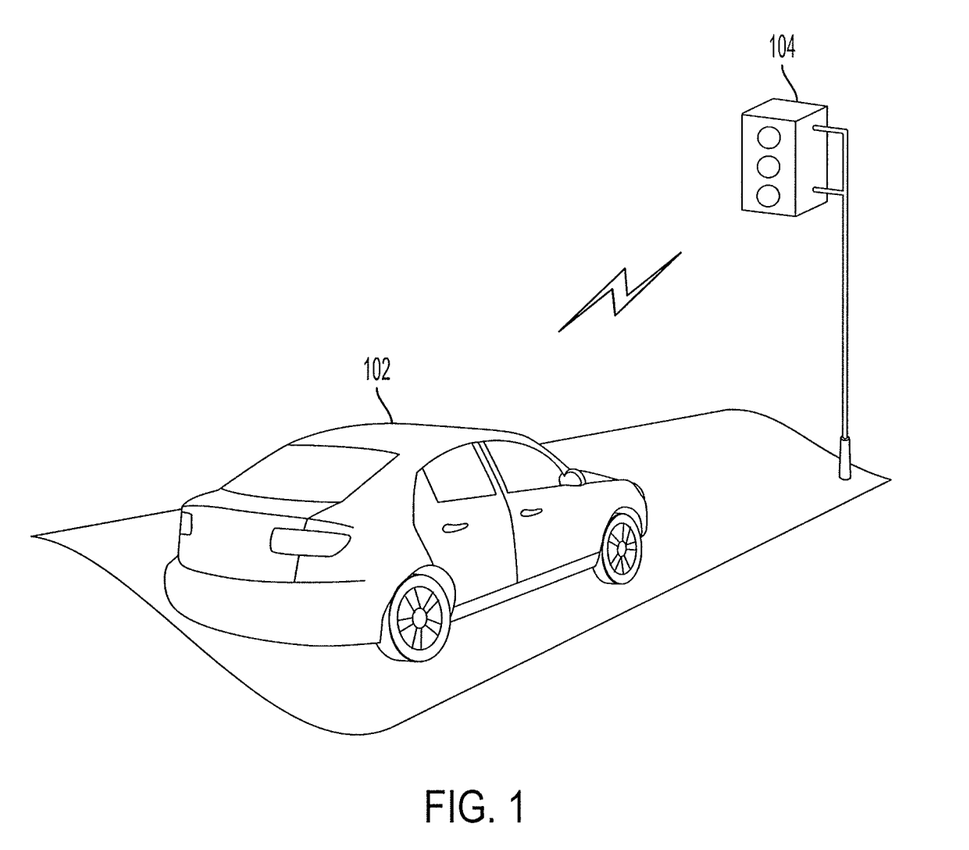
FIG. 1 illustrates a vehicle communicating with a traffic light, according to various embodiments of the invention.

FIG. 1 illustrates a vehicle 102 communicating with a traffic light 104 (or "traffic signal"). The traffic light 104 may communicate to the vehicle 102 traffic light data. The traffic light data may include traffic light timing data and traffic light location data. The traffic light location data may be a geographic indicator of where the traffic light 104 and other traffic lights are located. The traffic light timing data may include the light timing associated with the traffic light 104 and other traffic lights. The light timing indicates when a traffic light will turn from green to yellow, from yellow to red, and from red to green, for example.

The light timing data may be pairings of a time and a transition from one light to another. For example, the light timing data may indicate that at 1:42:00 PM, the light will turn from red to green, at 1:44:30 PM, the light will turn from green to yellow, and at 1:44:32, the light will turn from yellow to red. The light timing data may be ranges of time where a particular light will be displayed. For example, the light timing data may indicate that from 1:40:30 PM to 1:42:00 PM, the light will be red, from 1:42:00 PM to 1:44:30 PM, the light will be green, from 1:44:30 PM to 1:44:32, the light will be yellow, and from 1:44:32 to 1:45:52, the light will be red. The light timing data may be static timing that indicates how long each light will be shown, but is not associated with an absolute time. For example, the light timing data may indicate that green will be shown for 1 minute, 20 seconds, yellow will be shown for 3 seconds, and red will be shown for 1 minute, 20 seconds. When the light timing data is static timing, the vehicle 102 may use one or more sensors, such as a camera, to detect a time that the traffic light 104 begins showing a light color, and the vehicle 102 is able to determine an absolute timing associated with the traffic light 104 based on the light timing data.

Using the traffic light data and traffic data, the vehicle 102 is able to provide a more accurate, real-time estimate of travel time to a destination. Any changes in timing to the traffic light 104 or other traffic lights may be communicated to the vehicle 102. In some embodiments, the traffic lights communicate directly with each other and directly with vehicles. In some embodiments, the traffic lights and the vehicles communicate with each other via a central server.

In some embodiments, the traffic light 104 does not communicate directly with the vehicle 102, and other methods are used to determine traffic light timing data. Vehicle telemetry (e.g., location data, vehicle speed data, camera data) of many vehicles travelling over an area over a significant period of time may be used to determine the traffic light timing data. The traffic light timing data may be provided by a municipality on a remote data server accessible by the vehicle. A combination of traffic light timing data from many sources (e.g., from the traffic light, from a municipality, and observed based on vehicle telemetry data) may be used in combination to determine the traffic light timing data of a given traffic light.

Figure 2:
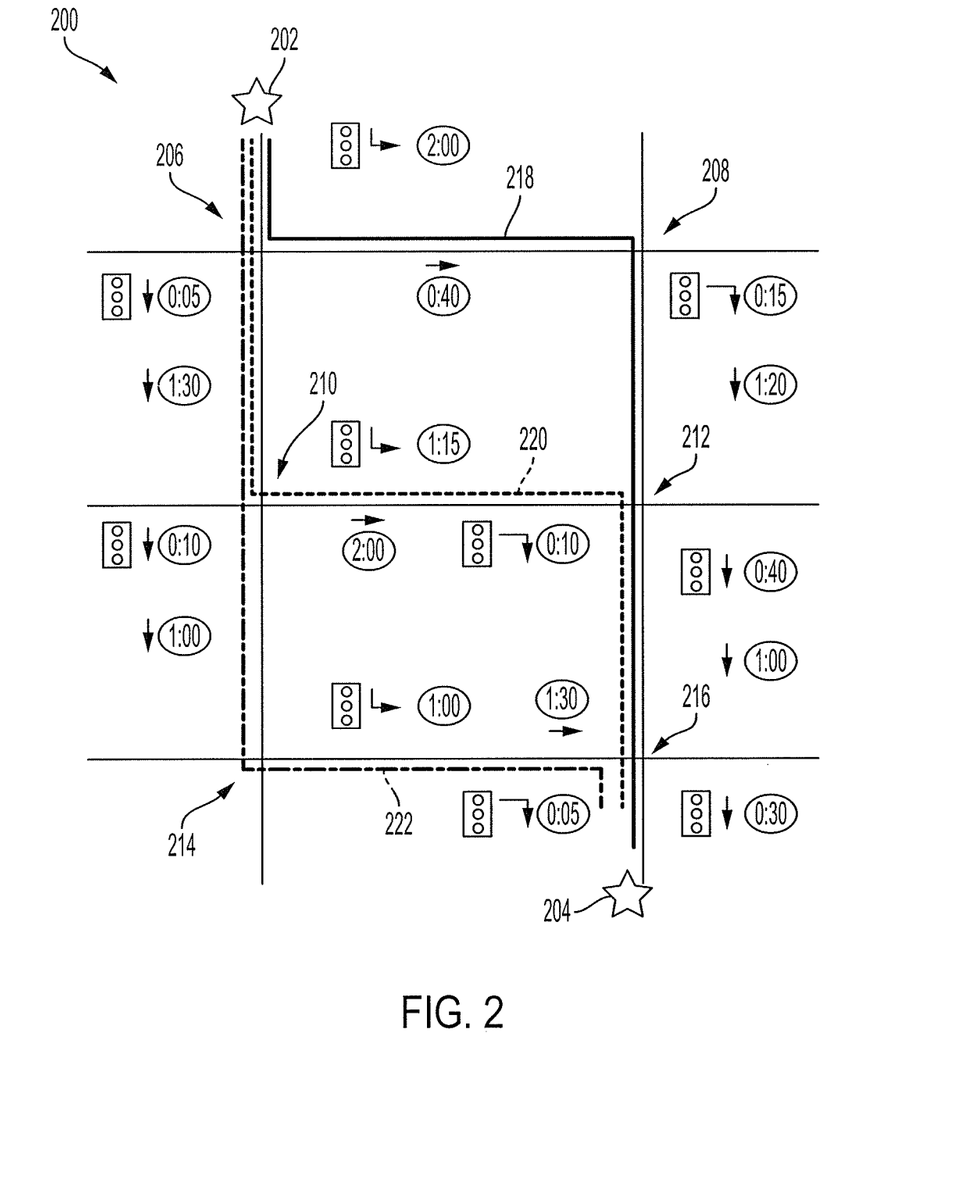
FIG. 2 illustrates vehicle routing based on traffic light data, according to various embodiments of the invention.

FIG. 2 illustrates a map 200 showing comparison of routes based on traffic light data and traffic data.

A vehicle travelling from the origin 202 to the destination 204 has three possible routes—first route 218, second route 220, and third route 222. The first route 218 turns left at the first intersection 206, turns right at the second intersection 208, goes straight through the fourth intersection 212, and straight through the sixth intersection 216. The second route 220 goes straight through the first intersection 206, turns left at the third intersection 210, turns right at the fourth intersection 212, and goes straight through the sixth intersection 216. The third route 222 goes straight through the first intersection 206, straight through the third intersection 210, makes a left turn at the fifth intersection 214, and a right turn at the sixth intersection 216.

The map 200 includes travel times associated with each road segment between intersections, as well as time associated with traffic lights at each intersection. For example, if a vehicle travelling from the origin 202 travels straight through the first intersection 206, it will take the vehicle 5 seconds, but if the vehicle makes a left turn at the first intersection 206, it will take the vehicle 2 minutes. There may be a long line of vehicles making left turns at the first intersection 206, or there may only be a brief window of time to make a left turn at the first intersection 206, for example.

The times associated with traffic lights at each intersection may be determined based on the traffic light data and the traffic data. In some embodiments, the vehicle receives the traffic light data and the traffic data and the vehicle determines the times associated with each traffic light. In some embodiments, a remote data server receives the traffic light data and the traffic data and the remote data server determines the times associated with each traffic light and communicates the determined times to the vehicle.

Conventional vehicle navigation systems only account for the travel times associated with the road segments between intersections. Thus, a conventional vehicle navigation system may determine that the first route 218 takes 3 minutes, the second route 220 takes 4 minutes and 30 seconds, and the third route 222 takes 4 minutes. As a result, a conventional vehicle navigation system may recommend taking the first route 218.

The systems and methods described herein take the time associated with the traffic lights into consideration. As a result, the first route 218 has a travel time estimate of 6 minutes and 25 seconds, the second route 220 has a travel time estimate of 6 minutes and 30 seconds, and the third route 222 has a travel time estimate of 5 minutes and 20 seconds. Notably, travelling straight through the fourth intersection 212 and the sixth intersection 216 may take more time than anticipated because the lights at those intersections may only be green for a relatively short period of time for vehicles travelling along the first route 218.

The timings associated with each route may be updated, as there may be changes in traffic data and changes in traffic light timing data. In some embodiments, the timings are updated periodically. For example, the timings may be updated every minute, 5 minutes, or every hour. In some embodiments, the timings are updated when the traffic light reports a change in the traffic light timing data. In some embodiments, the system determines when a change in the traffic light timing data is likely, based on previous traffic light timing data, and the system may update the timings associated with each route based on a predicted change in traffic light timing data.

The system may keep track of vehicle telemetry to determine a routine of driving (e.g., commute to work or commute home). The system may then recommend a route to accommodate the detected routine of driving that takes the traffic light timing data into account. For example, a user may drive to work in the morning using the second route 220, but the system may determine that the third route 222 is actually the fastest route, and may begin recommending to the user to take the third route 222 on the user's morning commute. The detected patterns and trends may be based on an individual or based on a population at large in a given area.

The system may also determine an optimal time to leave for a route between a starting location and a destination that takes into account the known traffic light timing data of the traffic lights between the starting location and the destination.

Figure 3:
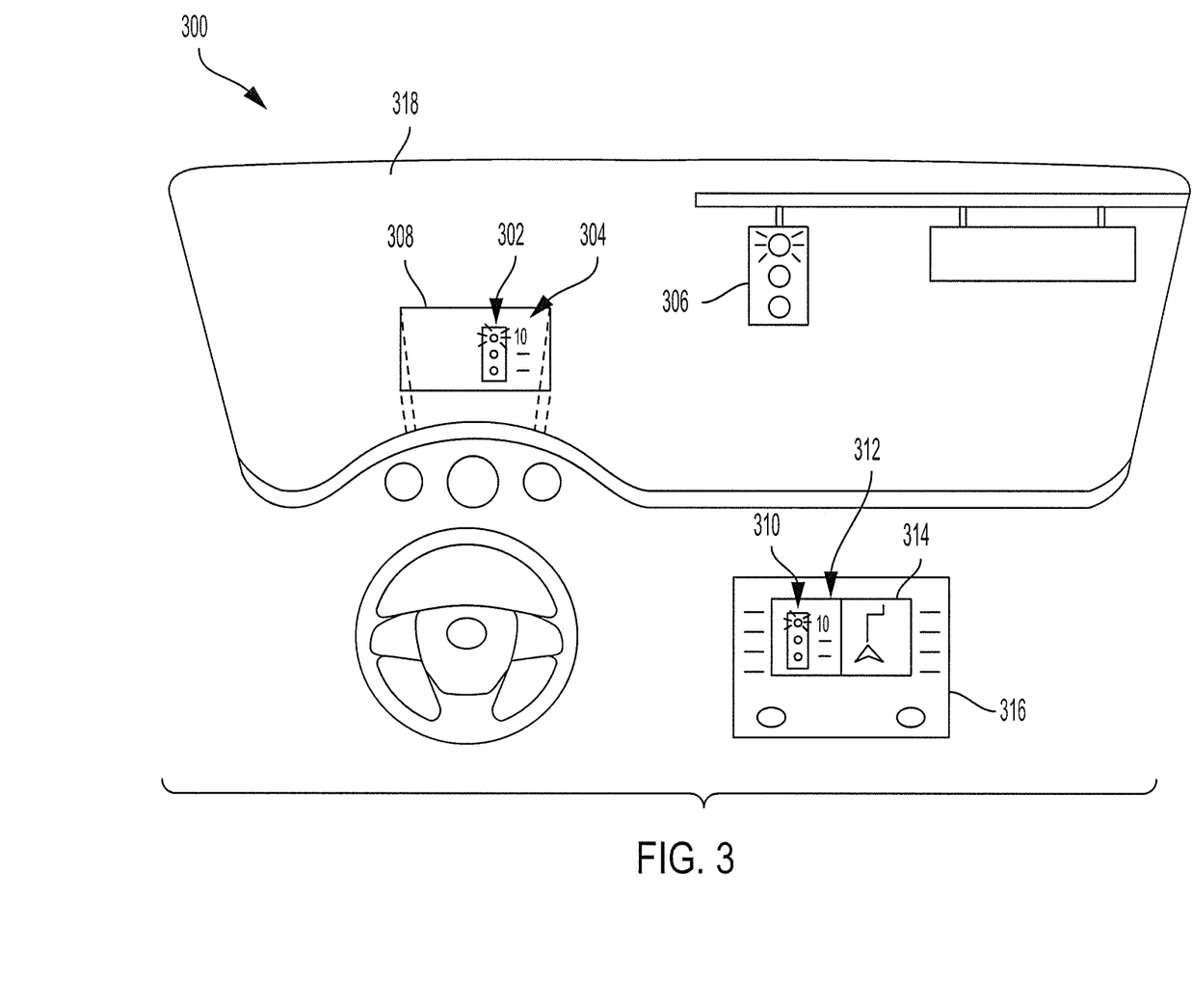
FIG. 3 illustrates presentation of traffic light information to a driver, according to various embodiments of the invention.

FIG. 3 illustrates example user interfaces presenting traffic light data to the driver of the vehicle 300. The vehicle 300 may include a heads-up display (HUD) image 308 that is projected onto a front windshield 318 of the vehicle 300. The HUD image 308 may include a traffic light icon 302 and a timer 304 associated with each light of the traffic light icon 302. The traffic light icon 302 corresponds with a traffic light 306 that the vehicle 300 is facing, and the timer 304 corresponds with the amount of time left in the current light segment. For example, the traffic light 306 may be showing a red light. The traffic light icon 302 also shows that the red light is activated, and the timer 304 indicates that there are 10 seconds left on the red light.

By knowing the amount of time left on the red light, in some situations, the vehicle 300 may be able to perform a rolling stop as the vehicle 300 approaches the traffic light 306, whereby the vehicle 300 slows down, but not come to a complete stop, and accelerates when the light turns green. The rolling stop allows the vehicle 300 to conserve fuel or electricity and reduce wear and tear on vehicle components. An autonomous or semi-autonomous vehicle may use the timing to perform a rolling stop to conserve energy.

By knowing the amount of time left on a green light, in some situations, the vehicle 300 may be able to safely slow down or reasonably accelerate to ensure the vehicle 300 does not risk crossing an intersection on a red light.

The vehicle 300 may also have an infotainment unit 316, which has an input/output device 314 (e.g., a touchscreen display). The input/output device 314 may also display a traffic light icon 310 similar to traffic light icon 302, as well as a timer 312 similar to timer 304.

The vehicle 300 may communicate directly with the traffic light 306 to receive the traffic light timing data. The vehicle 300 may receive the traffic light timing data from another source, such as a remote data server, another vehicle, or a mobile device (e.g., a smartphone).

Put differently, the traffic light icon 302 and the timer 304 reflects a current state (e.g., red light, yellow light, green light) of the traffic light 306 in front of the vehicle 300, as well as a time remaining in the current state. In some embodiments, the traffic light icon 302 and the timer 304 show the time associated with every state of the traffic light 306. For example, when the traffic light 306 is green for 2 minutes, red for 1 minute 55 seconds, and yellow for 5 seconds, the timer 304 may count down on from 2 minutes when the light is green, and the timer next to the red light may show 1 minutes 55 seconds and the timer next to the yellow light may show 5 seconds.

Figure 4:
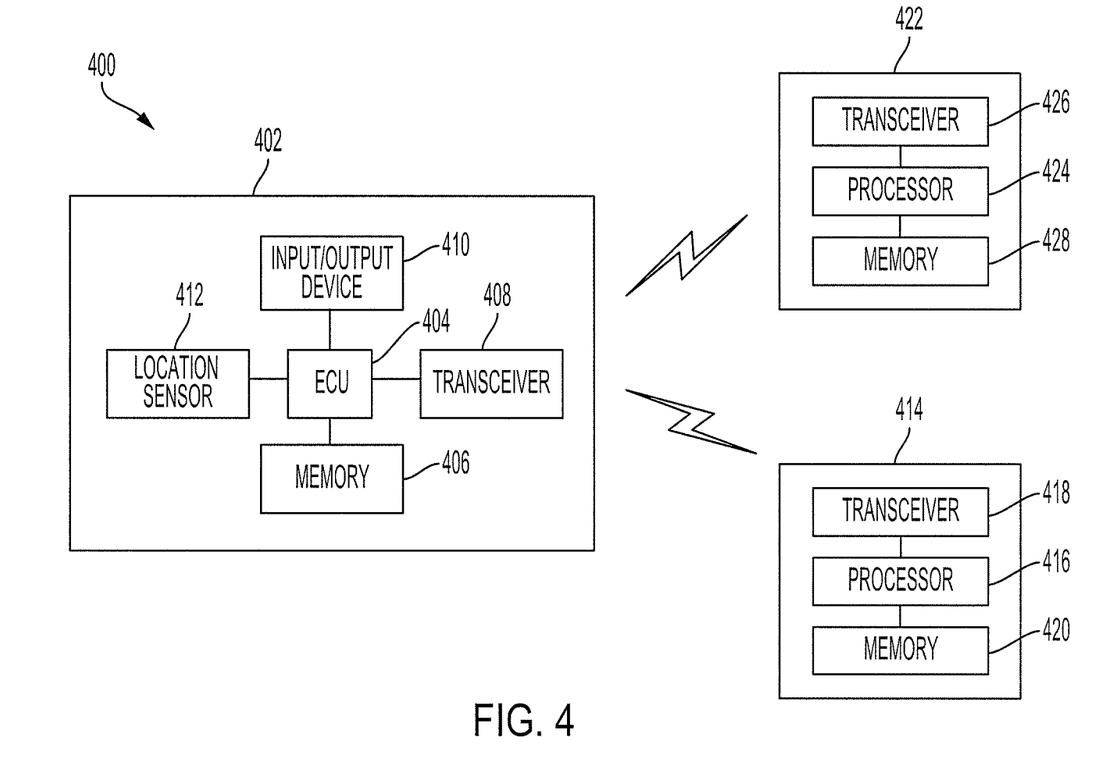
FIG. 4 illustrates a block diagram of the system, according to various embodiments of the invention.

FIG. 4 illustrates a block diagram of the system 400. The system 400 includes a vehicle 402, a traffic light 414, and a remote data server 422.

The vehicle 402 may have an automatic or manual transmission. The vehicle 402 is a conveyance capable of transporting a person, an object, or a permanently or temporarily affixed apparatus. The vehicle 402 may be a self-propelled wheeled conveyance, such as a car, a sports utility vehicle, a truck, a bus, a van or other motor or battery driven vehicle. For example, the vehicle 402 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 402 may be a semi-autonomous vehicle or an autonomous vehicle. That is, the vehicle 402 may be self-maneuvering and navigate without human input. An autonomous vehicle may use one or more sensors and/or a navigation unit to drive autonomously.

The vehicle 402 includes an electronic control unit (ECU) 404, an input/output device 410, a transceiver 408, a memory 406, and a location sensor 412.

Each ECU 404 may be one or more ECUs, appropriately programmed, to control one or more operations of the vehicle. The one or more ECUs 404 may be implemented as a single ECU or in multiple ECUs. The ECU 404 may be electrically coupled to some or all of the components of the vehicle. In some embodiments, the ECU 404 is a central ECU configured to control one or more operations of the entire vehicle. In some embodiments, the ECU 404 is multiple ECUs located within the vehicle and each configured to control one or more local operations of the vehicle. In some embodiments, the ECU 404 is one or more computer processors or controllers configured to execute instructions stored in a non-transitory memory 406.

The vehicle 402 and one or more other vehicles similar to vehicle 402 may be coupled to a network. The network, such as a local area network (LAN), a wide area network (WAN), a cellular network, a digital short-range communication (DSRC), the Internet, or a combination thereof, connects the vehicle 402 to a remote data server 422.

The transceiver 408 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 408 may transmit data to and receive data from devices and systems not directly connected to the vehicle. For example, the ECU 404 may communicate with the remote data server 422. Furthermore, the transceiver 408 may access the network, to which the remote data server 422 is also connected. The vehicle 402 may communicate with other vehicles directly or via a network.

The location sensor 412 is connected to the ECU 404 and configured to determine location data. The location sensor may be a GPS unit or any other global location detection device. The ECU 404 may use the location data along with the map data stored in the memory 406 to determine a location of the vehicle. In other embodiments, the location sensor 412 has access to the map data and may determine the location of the vehicle and provide the location of the vehicle to the ECU 404. In some embodiments, the location data of the vehicle 402 may be received from another device (e.g., mobile device, another vehicle) via the transceiver 408.

The memory 406 is connected to the ECU 404 and may be connected to any other component of the vehicle. The memory 406 is configured to store any data described herein, such as the map data, the location data, traffic light data, traffic light timing data, traffic light location data, and any data received from the remote data server 422 via the transceiver 408.

The input/output device 410 may be a touchscreen display or a display screen and an input device, such as a keyboard, microphone, or buttons. The input/output device 410 may be a touchscreen of an infotainment unit of the vehicle 402, a heads-up display, or a combination of a display screen of the infotainment unit and one or more buttons or knobs used to interact with the infotainment unit. The ECU 404 may be configured to render a graphical user interface to facilitate displaying of traffic light icons, timers, and traffic light based routes, each as described herein.

The vehicle 402 may receive traffic light data from the traffic light 414 directly. The traffic light 414 includes a processor 416, a memory 420, and a transceiver 418. The processor 416 of the traffic light 414 may be one or more computer processors configured to execute instructions stored in non-transitory memory 420. The memory 420 may also store the traffic light data, including traffic light timing data and traffic light location data. The traffic light data may be communicated by the traffic light 414 to the vehicle 402. The processor 416 of the traffic light 414 may use the transceiver 418 to communicate the traffic light data to the transceiver 408 of the vehicle 402. As described herein, the traffic light data may include traffic light data associated with the traffic light 414 as well as traffic light data associated with other traffic lights. The traffic light 414 may receive the traffic light data associated with other traffic lights from the remote data server 422 or from the other traffic lights.

The remote data server 422 includes a processor 424, a memory 428, and a transceiver 426. The processor 424 of the remote data server 422 may be one or more computer processors configured to execute instructions stored in non-transitory memory 428. The memory 428 may also store the traffic light data, including traffic light timing data and traffic light location data, of a plurality of traffic lights. The traffic light data may be communicated by the remote data server 422 to the vehicle 402. The processor 424 of the remote data server 422 may use the transceiver 426 to communicate the traffic light data to the transceiver 408 of the vehicle 402. As described herein, the traffic light data includes respective traffic light data of a plurality of traffic lights.

The traffic light 414 may communicate the traffic light data to the remote data server 422. That is, the processor 416 uses the transceiver 418 to communicate the traffic light data stored in memory 420 to the transceiver 426 of the remote data server 422. The processor 424 of the remote data server 422 may collect all of the traffic light data from many traffic lights (e.g., hundreds, thousands, or millions of traffic lights) and determine routes and timings of routes that take the traffic light data and traffic data into consideration, as illustrated in FIG. 2. The traffic data may be provided to the remote data server 422 from another remote data server similar to remote data server 422.

In some embodiments, the vehicle 402 communicates a current location and a destination to the remote data server 422, and the remote data server 422 may provide a plurality of routes and associated times based on the traffic light data of traffic lights between the current location of the vehicle 402 and the destination, as shown in FIG. 2. The remote data server 422 may have a plurality of processors specially configured for determining the plurality of routes and their associated times based on the traffic light data and traffic data, and the remote data server 422 may be better suited for this big data processing than the ECU of the vehicle.

In some embodiments, the vehicle 402 may receive the traffic light data from the remote data server 422 and the vehicle determines the plurality of routes and associated times based on the traffic light data of traffic lights between the current location of the vehicle 402 and the destination, as shown in FIG. 2.

While only one remote data server 422 is shown, any number of remote data servers in communication with each other may be used. For example, a first remote data server may be used to store and communicate traffic light data and a second remote data server may be used to store and communicate traffic data. Likewise, while only one traffic light 414 is shown, any number of traffic lights in communication with each other may be used.

Figure 5A:
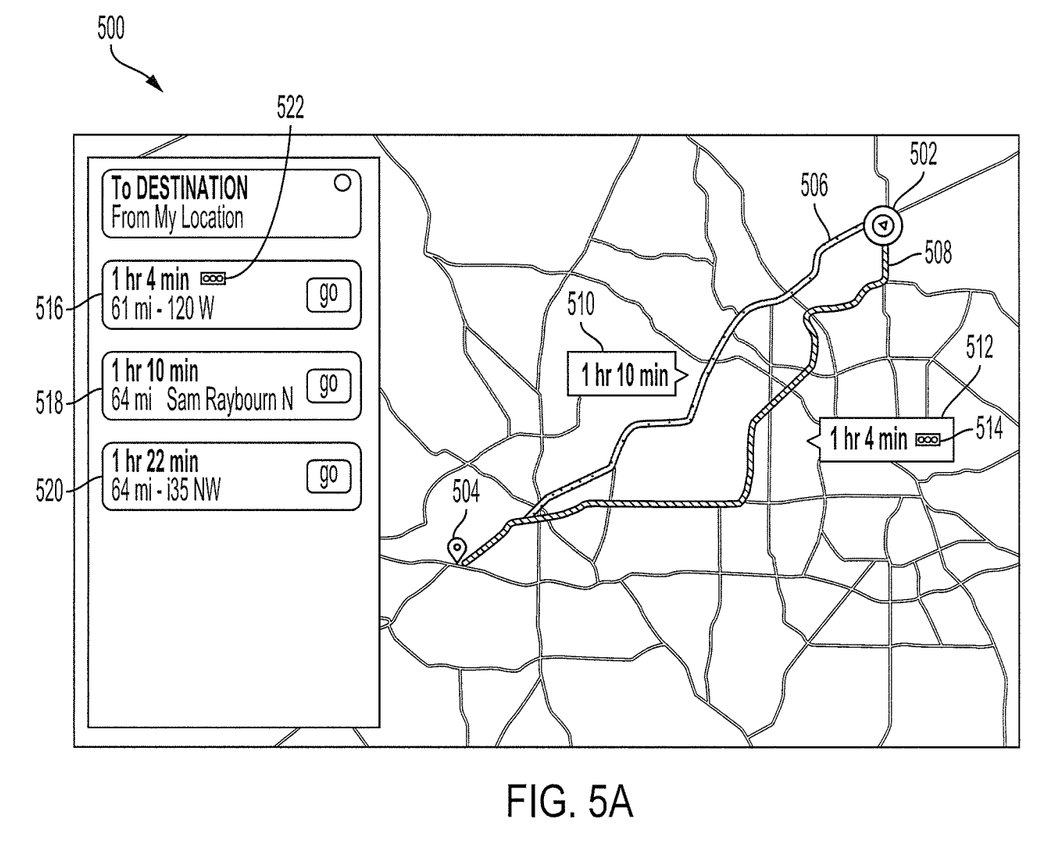
FIGS. 5A-5C illustrate a user interface, according to various embodiments of the invention.
Figure 5B:
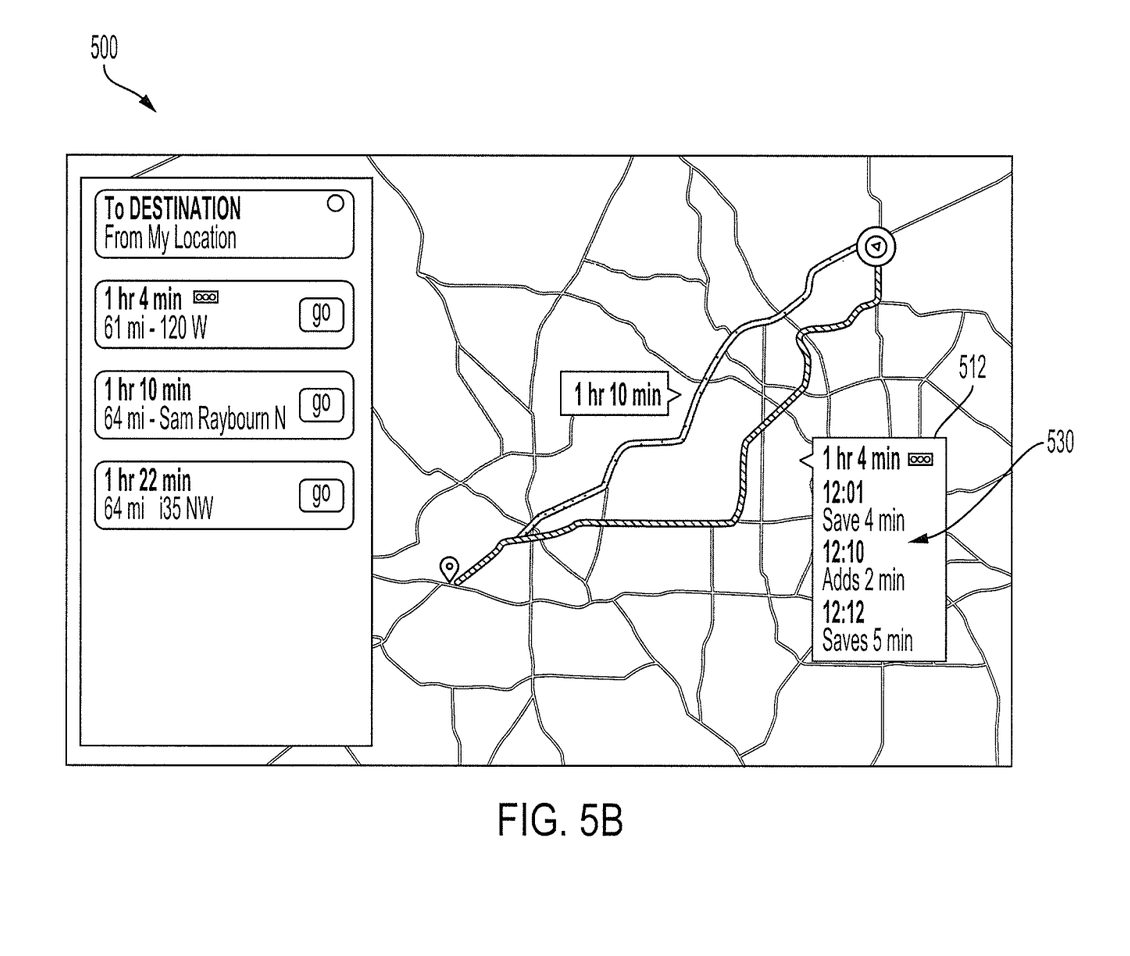
Figure 5C:
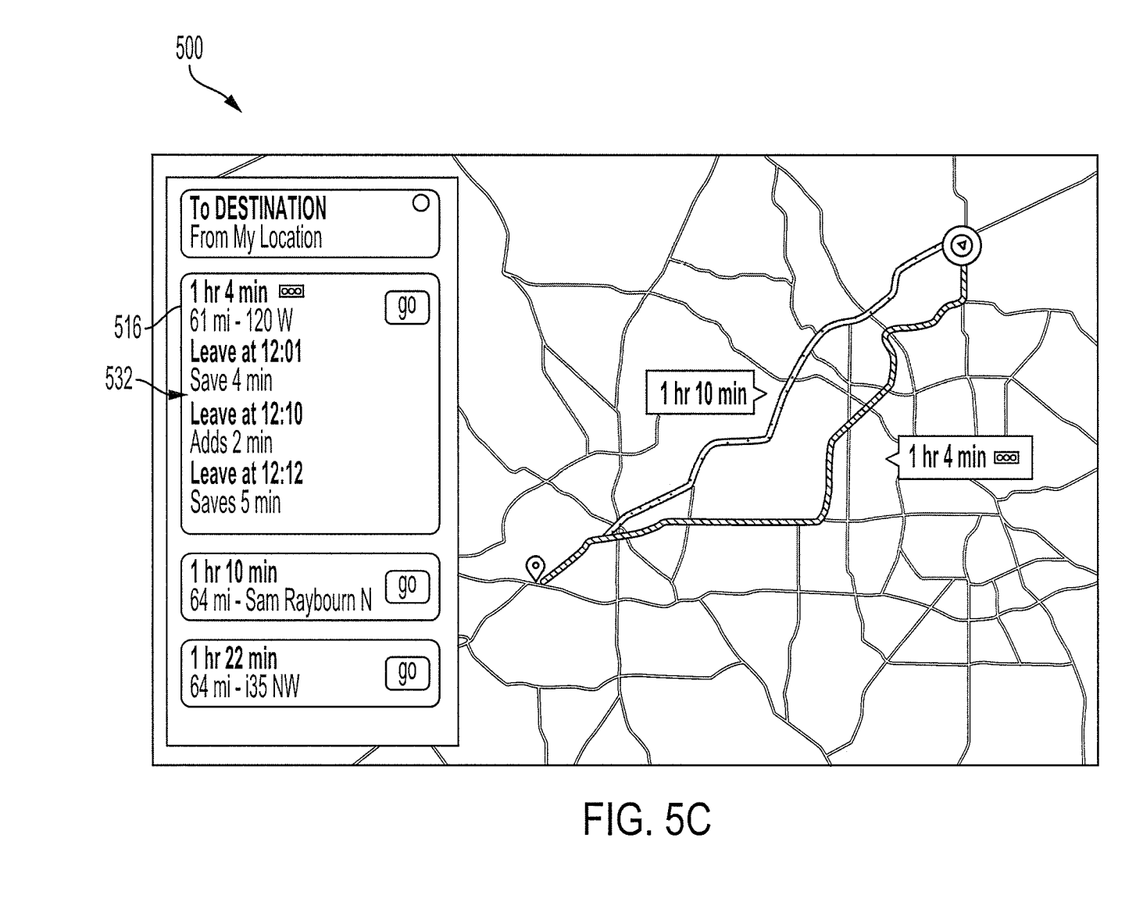

FIGS. 5A-5C illustrate an example user interface 500 using the systems and methods described herein. The user interface 500 may be rendered by an ECU (e.g., ECU 404) of a vehicle and displayed on an input/output device (e.g., input/output device 410) of the vehicle.

The user interface 500 includes a current location icon 502 representing the location of the vehicle. The user interface 500 also includes a destination icon 504 representing the desired destination. The user interface 500 also includes a plurality of possible routes—a first route 506 and a second route 508 between the current location of the vehicle and the destination.

The ECU and a location sensor (e.g., location sensor 412) may determine the current location of the vehicle and the plurality of possible routes. The ECU may determine a time associated with each route of the plurality of possible routes. The ECU may use traffic light data received from a traffic light (e.g., traffic light 414) and/or a remote data server (e.g., remote data server 422) to determine the time associated with each route of the plurality of routes. The time associated with each route is displayed. A first time icon 510 is presented adjacent to the first route 506 and a second time icon 512 is presented adjacent to the second route 508. Time icons 516-520 associated with the routes may also be presented in a list on the user interface 500. The list may also include additional information (e.g., distance, main roads taken) and may also provide a selection icon for selecting the corresponding route.

In some situations, an overall drive time may be reduced when the driver departs later, as traffic and/or traffic light presentation changes. For example, traffic may be expected to clear up and/or the timing of traffic lights may change such that when the driver departs at 3:00 PM, a given route may take 30 minutes, but if the driver departs at 3:03 and uses the route calculated by the vehicle, the route may take 25 minutes, saving the driver 2 minutes overall and 5 minutes in driving time. These situations may not always be available, but when they are, a traffic light icon is present in the time icon (e.g., traffic light icon 514 in the second time icon 512 and traffic light icon 522 in the corresponding side time icon 516). The timings associated with each route may be updated, as described herein. In some embodiments, the traffic light icon 522 only appears when time may be saved by waiting to depart. In some embodiments, the traffic light icon 522 only appears when the time to be saved by waiting to depart exceeds a threshold time savings value. The threshold time savings value may be stored in any of the memory described herein, and may be set by the user and changed by the user.

FIG. 5B illustrates the user interface 500 when the second time icon 512 is selected (e.g., tapped on a touchscreen). The second time icon 512 expands (as compared to the second time icon 512 of FIG. 5A) and the timing information 530 is displayed. The timing information 530 includes a list of departure times and corresponding effect on overall drive time. For example, if the vehicle were to depart at 12:01, the overall drive time of 1 hour, 4 minutes would be reduced by 4 minutes; if the vehicle were to depart at 12:10, the overall drive time of 1 hour, 4 minutes would be increased by 2 minutes; and if the vehicle were to depart at 12:12, the overall drive time of 1 hour, 4 minutes would be reduced by 5 minutes. When the timing information 530 is located proximal to the route on the user interface, it is easier for the user to identify which route is associated with the timing information 530.

FIG. 5C illustrates the user interface 500 when the side time icon 516 is selected (e.g., tapped on a touchscreen). The side time icon 516 expands (as compared to the side time icon 516 of FIG. 5A) and the timing information 532 is displayed. The timing information 532 includes a list of departure times and corresponding effect on overall drive time. When the timing information 532 is located to the side, the timing information 532 may not get in the way of other information on the map, such as city names or road identifiers, for example.

The views of FIGS. 5B and 5C may be toggled. That is, when the second time icon 512 is selected and expanded (thus showing the timing information 530), the side time icon 516 is collapsed (thus hiding the timing information 532) and when the side time icon 516 is selected and expanded (thus showing the timing information 532), the second time icon 512 is collapsed (thus hiding the timing information 530).

The views of FIGS. 5B and 5C may be expanded and/or collapsed independently of one another. That is, the second time icon 512 and the side time icon 516 may both be expanded, the second time icon 512 and the side time icon 516 may both be collapsed, the second time icon 512 may be expanded and the side time icon 516 may be collapsed, or the second time icon 512 may be collapsed and the side time icon 516 may be expanded.

The systems and methods described herein use the traffic light timing data to minimize the trip length in terms of time. This may be used in contexts where the cost of transportation is a function of time. For example, a ridesharing service may provide an indication to the user that if the user waits until 12:12, the trip may be 5 minutes shorter, and thus a corresponding amount of currency cheaper. In addition, the systems and methods described herein may result in drivers of rideshare vehicles driving more efficiently, thus saving the user money.

The systems and methods described herein may be used in conjunction with other cost determining systems to determine an overall cost associated with operating a vehicle on a trip. For example, an overall cost taking into account energy costs, toll costs, operational wear and tear costs, and/or insurance costs may be determined for a route. The systems and methods described herein may provide along with the route data, a cost savings associated with a particular route based on the traffic light timing data and the traffic data.

Figure 6:
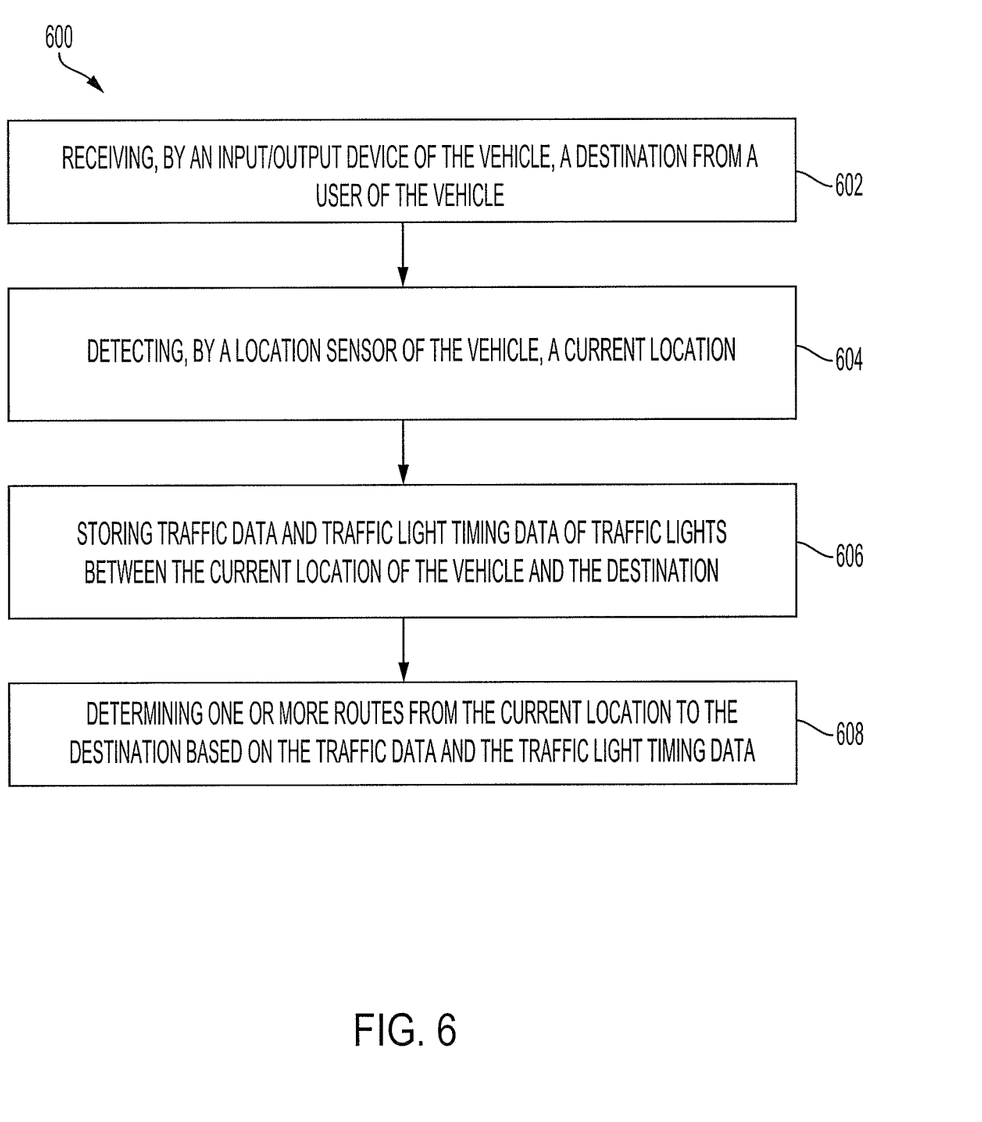
FIG. 6 illustrates a process of the system, according to various embodiments of the invention.

FIG. 6 illustrates a process 600 performed by the system described herein.

An input/output device (e.g., input/output device 410) receives a destination from a user of a vehicle (e.g., vehicle 402) (step 602). A location sensor (e.g., location sensor 412) detects a current location of the vehicle (step 604).

Traffic data and traffic light timing data of traffic lights between the current location and the destination are stored (step 606). In some embodiments, the traffic data is received by a remote data server (e.g., remote data server 422) via a transceiver (e.g., transceiver 426) and stored in a memory (e.g., memory 428) of the remote data server. The traffic data may be communicated by the remote data server to the vehicle via respective transceivers and stored in a memory (e.g., memory 406) of the vehicle. The traffic light timing data may also be communicated by the remote data server to the vehicle via respective transceivers and stored in the memory of the vehicle. In some embodiments, the traffic data is stored in the memory of the remote data server and the traffic timing data is stored in a memory (e.g., memory 420) of a traffic light (e.g., traffic light 414). The traffic light may communicate the traffic timing data to the remote data server via respective transceivers and/or the traffic light may communicate the traffic light timing data to the vehicle via respective transceivers.

One or more routes are determined between the current location and the destination based on the traffic data and the traffic light timing data (step 608). In some embodiments, a processor (e.g., processor 424) of the remote data server determines the one or more routes based on the traffic data and the traffic light timing data stored in the memory of the remote data server. In these embodiments, the vehicle communicates its current location and destination to the remote data server. In some embodiments, the ECU (e.g., ECU 404) of the vehicle determines the one or more routes based on the traffic data and the traffic light timing data stored in the memory of the vehicle. In these embodiments, the traffic data and the traffic light timing data are received from the remote data server and/or the traffic light.

The one or more routes may be displayed by the input/output device for selection by the user of the vehicle. When the vehicle is a non-autonomous vehicle, turn-by-turn navigation instructions may be provided to the driver of the vehicle. When the vehicle is an autonomous or semi-autonomous vehicle, the vehicle may drive to the destination using the route chosen by the user. An autonomous or semi-autonomous vehicle may use the systems and methods described herein to operate in an energy-efficient and time-efficient manner.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for navigating a vehicle, the system comprising:
   an input/output device on the vehicle configured to receive data indicative of a destination from a user of the vehicle and display an output;
   a transceiver on the vehicle configured to receive traffic data and traffic light timing data of one or more traffic lights between a current location of the vehicle and the destination; and
   an electronic control unit (ECU) on the vehicle coupled to the input/output device and the transceiver and configured to:
   determine one or more routes from the current location of the vehicle to the destination based on the traffic data and the traffic light timing data,
   determine that the user may save time greater than a threshold time saving value by delaying departure from the current location of the vehicle to the destination by a prescribed time period based on the traffic data and the traffic light timing data,
   prompt the input/output device to display an icon or a notification when the time to be saved is greater than the threshold time saving value, and
   control the vehicle to traverse to the destination via at least one of the one or more routes following the delay of the departure by the prescribed time period.

2. The system of claim 1, wherein the transceiver is further configured to receive at least a portion of the traffic light timing data from at least a traffic light having a memory configured to store at least the portion of the traffic light timing data and a transceiver configured to communicate at least the portion of the traffic light timing data to the transceiver on the vehicle.

3. The system of claim 1, wherein the transceiver is further configured to receive at least a portion of the traffic light timing data from at least a remote data server having a memory configured to store at least the portion of the traffic light timing data and a transceiver configured to communicate at least the portion of the traffic light timing data to the transceiver on the vehicle.

4. The system of claim 1, wherein the input/output device is further configured to display a traffic light icon and a timer associated with a traffic light in front of the vehicle and showing a current state of the traffic light and a time remaining of the current state of the traffic light.

5. The system of claim 1, wherein the ECU is further configured to determine a driving routine of the vehicle based on vehicle telemetry data, the driving routine having a starting location, a destination, and a time range of departure and determine an optimal route between the starting location included in the driving routine and the destination included in the driving routine and an optimal time for departure from the starting location included in the driving routine to the destination included in the driving routine based on traffic light timing data of traffic lights between the starting location included in the driving routine and the destination included in the driving routine, and
wherein the input/output device is further configured to display the optimal route and the optimal time for departure.

6. The system of claim 1, wherein the traffic light timing data changes over time, and wherein the transceiver on the vehicle is further configured to receive updated traffic light timing data on a periodic basis.

7. The system of claim 1, wherein the traffic light timing data is based on a combination of timing data received from the one or more traffic lights, traffic light patterns determined based on vehicle telemetry data, and timing data received from a municipality.

8. A system for navigating a vehicle, the system comprising:
an input/output device configured to receive data indicative of a destination from a user of the vehicle and display an output;
a location sensor configured to detect a current location of the vehicle;
a memory on or within a remote data server configured to store traffic data and traffic light timing data of one or more traffic lights between the current location of the vehicle and the destination;
a processor on or within the remote data server connected to the input/output device, the location sensor, and the memory and configured to:
determine one or more routes from the current location of the vehicle to the destination based on the traffic data and the traffic light timing data,
determine that the user may save time greater than a threshold time saving value by delaying departure from the current location of the vehicle to the destination by a prescribed time period based on the traffic data and the traffic light timing data,
prompt the input/output device to display an icon or a notification when the time to be saved is greater than the threshold time saving value, and
control the vehicle to traverse to the destination via at least one of the one or more routes following the delay of the departure by the prescribed time period; and
a transceiver on the remote data server connected to the processor and configured to receive data indicative of the current location of the vehicle and the data indicative of the destination and communicate information including the determined one or more routes from the current location of the vehicle to the destination to a transceiver on the vehicle.

9. The system of claim 8, wherein the transceiver on the remote data server is further configured to receive at least a portion of the traffic light timing data from at least a traffic light having a memory configured to store at least the portion of the traffic light timing data and a transceiver configured to communicate at least the portion of the traffic light timing data to the transceiver on the remote data server.

10. The system of claim 8, wherein the input/output device is further configured to display a traffic light icon and a timer associated with a traffic light in front of the vehicle and showing a current state of the traffic light and a time remaining of the current state of the traffic light.

11. The system of claim 8, wherein the processor is further configured to determine a driving routine of the vehicle based on vehicle telemetry data, the driving routine having a starting location, a destination, and a time range of departure and determine an optimal route between the starting location included in the driving routine and the destination included in the driving routine and an optimal time for departure from the starting location included in the driving routine to the destination included in the driving routine based on traffic light timing data of traffic lights between the starting location included in the driving routine and the destination included in the driving routine, and
wherein the input/output device is further configured to display the optimal route and the optimal time for departure.

12. The system of claim 8, wherein the traffic light timing data changes over time, and wherein the transceiver on the remote data server is further configured to receive updated traffic light timing data on a periodic basis.

13. The system of claim 8, wherein the traffic light timing data is based on a combination of timing data received from the one or more traffic lights, traffic light patterns determined based on vehicle telemetry data, and timing data received from a municipality.

14. A method for navigating a vehicle, the method comprising:
receiving, by an input/output device, data indicative of a destination from a user of the vehicle;
detecting, by a location sensor, a current location of the vehicle;
storing, by a memory, traffic data and traffic light timing data of one or more traffic lights between the current location of the vehicle and the destination;
determining, by an electronic control unit (ECU) coupled to the input/output device, the location sensor, and the memory, one or more routes from the current location of the vehicle to the destination based on the traffic data and the traffic light timing data;
determining, by the ECU, that the user may save time greater than a threshold time saving value by delaying departure from the current location of the vehicle to the destination by a prescribed time period based on the traffic data and the traffic light timing data;

displaying, by the input/output device, an icon or a notification when the time to be saved is greater than the threshold time saving value; and controlling, by the ECU, the vehicle to traverse to the destination via at least one of the one or more routes following the delay of the departure by the prescribed time period.

15. The method of claim 14, further comprising receiving, by a transceiver coupled to the ECU, at least a portion of the traffic light timing data from at least one traffic light.

16. The method of claim 14, further comprising displaying, by the input/output device, a traffic light icon and a timer associated with a traffic light in front of the vehicle and showing a current state of the traffic light and a time remaining of the current state of the traffic light.

* * * * *